United States Patent [19]
Comroe et al.

[11] Patent Number: 5,369,781
[45] Date of Patent: Nov. 29, 1994

[54] DISPATCH COMMUNICATION SYSTEM WITH ADJACENT SYSTEM SIGNAL REPEATING

[75] Inventors: Richard Comroe, Dundee; Arun Sobti, Wheaton, both of Ill.

[73] Assignee: Motorola, Inc., Schaumburg, Ill.

[21] Appl. No.: 832,137

[22] Filed: Feb. 6, 1992

Related U.S. Application Data

[63] Continuation-in-part of Ser. No. 457,650, Dec. 27, 1989, abandoned.

[51] Int. Cl.[5] ............................................. H04B 7/14
[52] U.S. Cl. ..................................... 455/15; 455/17; 455/33.1; 455/34.1; 455/56.1
[58] Field of Search .................... 455/11.1, 15–16, 455/34.1, 34.2, 33.1, 54.1, 56.1, 54.2, 17, 20

[56] References Cited

U.S. PATENT DOCUMENTS

| | | | |
|---|---|---|---|
| 4,718,108 | 1/1988 | Davidson et al. | 455/20 |
| 4,972,460 | 11/1990 | Sasuta | 455/17 |
| 5,058,199 | 10/1991 | Grube | 455/15 |
| 5,095,529 | 3/1992 | Comroe et al. | 455/16 |
| 5,179,720 | 1/1993 | Grube et al. | 455/56.1 |
| 5,293,638 | 3/1994 | Sasuta et al. | 455/20 |

Primary Examiner—Curtis Kuntz
Assistant Examiner—Andrew Faile
Attorney, Agent, or Firm—Jon P. Christensen

[57] ABSTRACT

A dispatch communication system wherein a communication unit may move from the service coverage area of a first system to the service coverage area of a second system during a communication transaction without the need to re-initiate the call. Communication units and base sites under this invention are constructed to relay signals to and from the system where the call originated.

4 Claims, 3 Drawing Sheets

5,369,781

DISPATCH COMMUNICATION SYSTEM WITH ADJACENT SYSTEM SIGNAL REPEATING

This is a continuation-in-part of Ser. No. 07/457,650 filed Dec. 27, 1989, now abandoned.

TECHNICAL FIELD

This invention relates generally to the field of communications systems and more specifically to dispatch systems.

BACKGROUND OF THE INVENTION

Dispatch communication systems are known. Such systems typically use frequency pairs (i.e., a transmit frequency and a receive frequency) that are assigned by a resource controller for transmitting and receiving messages. The resource controller assigns the frequency pair upon receiving a request for service from a communications unit or from a telephone interconnect party. Upon receiving the assignment data, the communication unit(s) involved tune to the appropriate frequencies and two-way communication can then occur.

Dispatch systems, unlike cellular telephone, are typically single site systems. While it is common for there to be large geographic areas covered by multiple adjacent, but independent dispatch systems, such systems do not provide for call hand-off when a user leaves the service area of one system and enters the service area of another system. Upon loss of contact, the communication unit which has left a dispatch system's service area may no longer participate in communications which were in progress at the time of the loss of contact.

In a group conversation, the unit lost is no longer part of the group conversation. However, in the case of a telephone interconnect conversation between a single communication unit and a land-line connected party, the conversation is interrupted when the communication unit leaves the service coverage area, although the connection between the land-line connected party and the trunked dispatch system where the call was set-up is still intact.

In the case of interrupted telephone interconnect conversations, the call must be re-initiated between the communication unit which has moved to the service coverage area of a different dispatch system, and the land-line party. However, if the call was initiated by the land-line party, the communication unit may not have a telephone number to dial-back the land-line party from the new dispatch system. Further, the land-line party may not be immediately aware of the loss of communications, resulting in the likelihood that the communication unit dialing back the land-line party will find the line busy. Further, the land-line party may not have knowledge of the location of the new service coverage area that the communication unit has entered following the loss of contact, thus inhibiting the land-line party from being able to re-initiate the call.

The requirement that a dispatch or interconnect user must re-establish contact every time a communication unit leaves a particular coverage area even though it may have moved in the service coverage area of an adjacent trunked system is an impediment to effective mobile communications. A need therefore exists to transfer calls to adjacent trunked systems without the need to re-initiate the call sequence.

SUMMARY OF THE INVENTION

Pursuant to one embodiment of this invention, in a geographic re-use context base sites for dispatch systems are constructed with additional transceivers (mobile function transceivers) that duplicate the functions of mobile transceivers. The additional transceivers allow base sites to communicate with other base sites with only a small increase in the cost of hardware to allow surrounding cells to relay signals from targets located within the service coverage area.

Whenever a dispatch system requestor requests service, the resource controller responds over a control resource with a data word identifying a communication resource, such as a frequency pair or TDM time slot. The resource controller also transmits information to target units regarding reception resources. Upon receipt by the requestor and target of the appropriate transmission and reception resources a voice link is established.

As a communicated signal is exchanged over the two-way link and the communication unit moves away from the resource controller and out of the first service coverage area, signal strengths decrease until the point is reached where the call must be transferred to a surrounding, transferee system or the call will be lost (or when, in fact, the call is lost). When this point is reached the communication unit scans the available resources to identify a control resource for an adjacent trunked system. When a control resource is found the mobile unit transmits data words containing sufficient information regarding the call in progress in the first trunked system, which has just been left, to re-establish contact through the adjacent, transferee system. This information may include: the first system ID, the unit's ID, the frequency of the first resource controller and the assigned communication frequency in the first system, etc.

The transferee resource controller receives the data word, decodes the signal, and takes appropriate steps to act as a repeater in the reception and re-transmission of the transferor's signals to the communication unit and visa versa. The transferee resource controller allocates a transceiver capable of transmitting to the transferor's base site (a mobile function transceiver) to receive and transmit signals to the transferor's transceiver. The transferee resource controller then sends a data word to the communication unit identifying a resource to the used in communications between a local transceiver located within the transferee cell and the communication unit, also now located in the transferee cell. The communications unit and the local transceiver then move to the assigned frequencies, the transferee resource controller allocates a signal path between the mobile function transceiver and the local transceiver and communications are re-established.

Note that the net effect is a continuation of a call in progress through the movement of the involved communication unit into the service coverage area of a new system without integration of the independent nature of the independent trunked communication system. In fact, the system where the communication was originally established is unaware of the existence of the adjacent trunked system which is acting as a repeater for continuing the call in progress, or that the communication unit has ever left the original service coverage area.

BEST MODE FOR CARRYING OUT THE INVENTION

Figure 1:
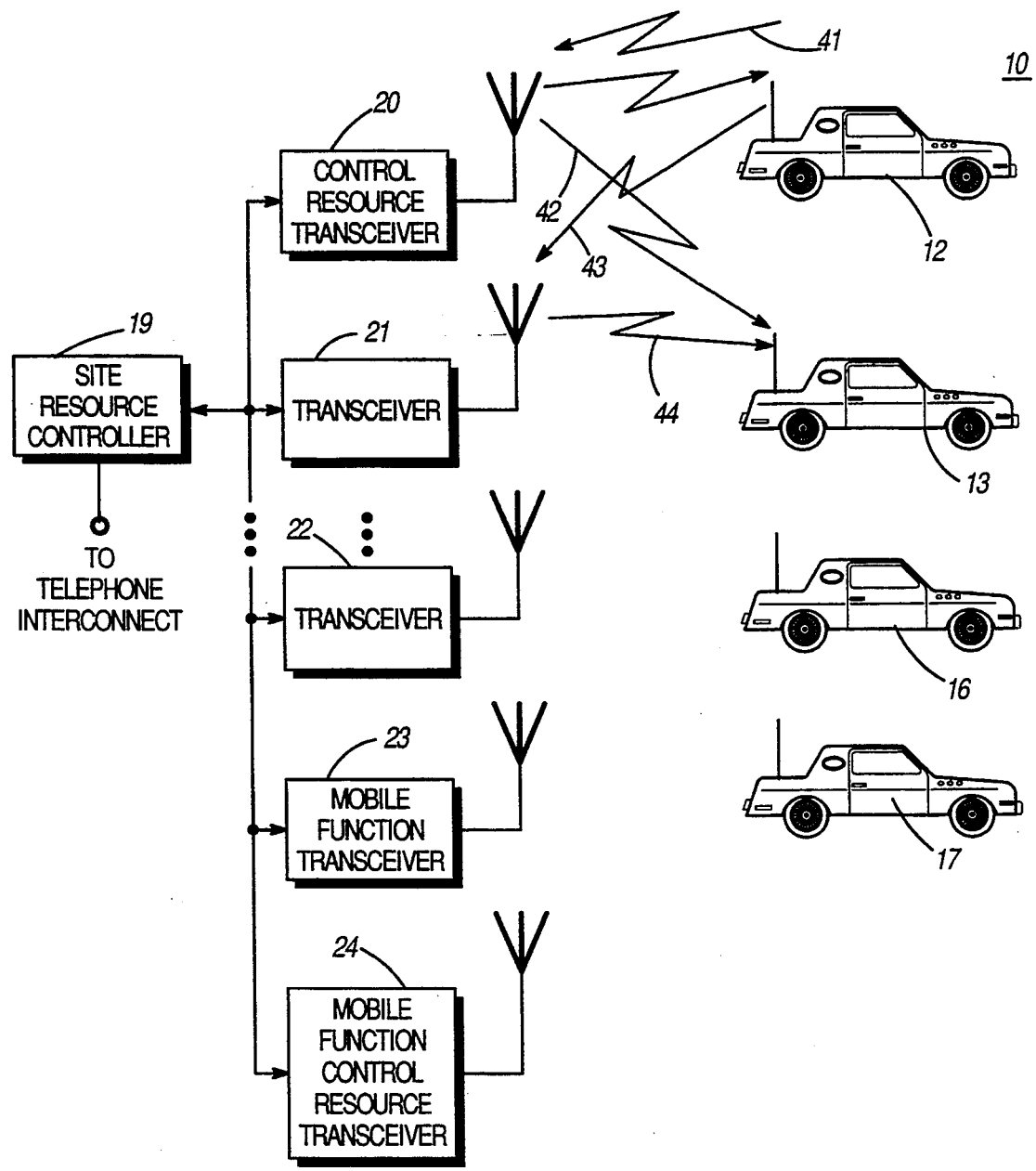
FIG. 1 comprises a block diagram of a dispatch system in accordance with the invention.

Referring now to FIG. 1, a block diagram of a trunked dispatch radio communication system can be seen as depicted generally by the number 10. The system (10) generally includes a plurality of communication units (12, 13, 16 and 17) (as used herein "communication units" refers to mobile units, or portable units), transceivers (21 and 22), and a site resource controller (19). The system (10) also includes a control resource transceiver (20) to allow two-way transmission of system control information.

Also shown in FIG. 1 are two boxes (23 and 24) labeled "Mobile Function Transceiver" and "Mobile Function Control Resource Transceiver". The devices shown in the two boxes (23 and 24) represent transceivers which substantially duplicate the function of a mobile transceiver (transmit on a mobile transmit frequency and receive on a mobile receive frequency). The function of the transceivers (23 and 24) is to allow the base site of a system (10) to exchange duplex communicated signals with other base sites of adjacent systems (not shown in FIG. 1).

Figure 6:
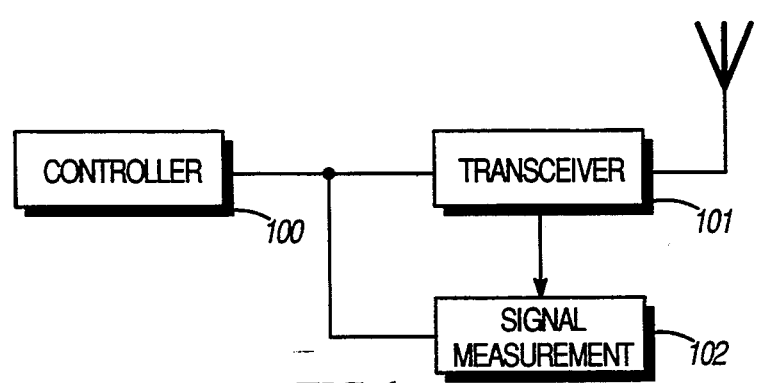
FIG. 6 is a block diagram of a communication unit according to the invention.

Shown in FIG. 6 is a block diagram of Communication units (12, 13, 16, and 17) in accordance with the invention. Included within communication units (12, 13, 16, and 17) is a controller (100), transceiver (101), and a signal measurement device (102). Communication units (12, 13, 16, and 17), in accordance with the invention, are constructed to measure signal strength of signals received from the system (10).

Figure 5:
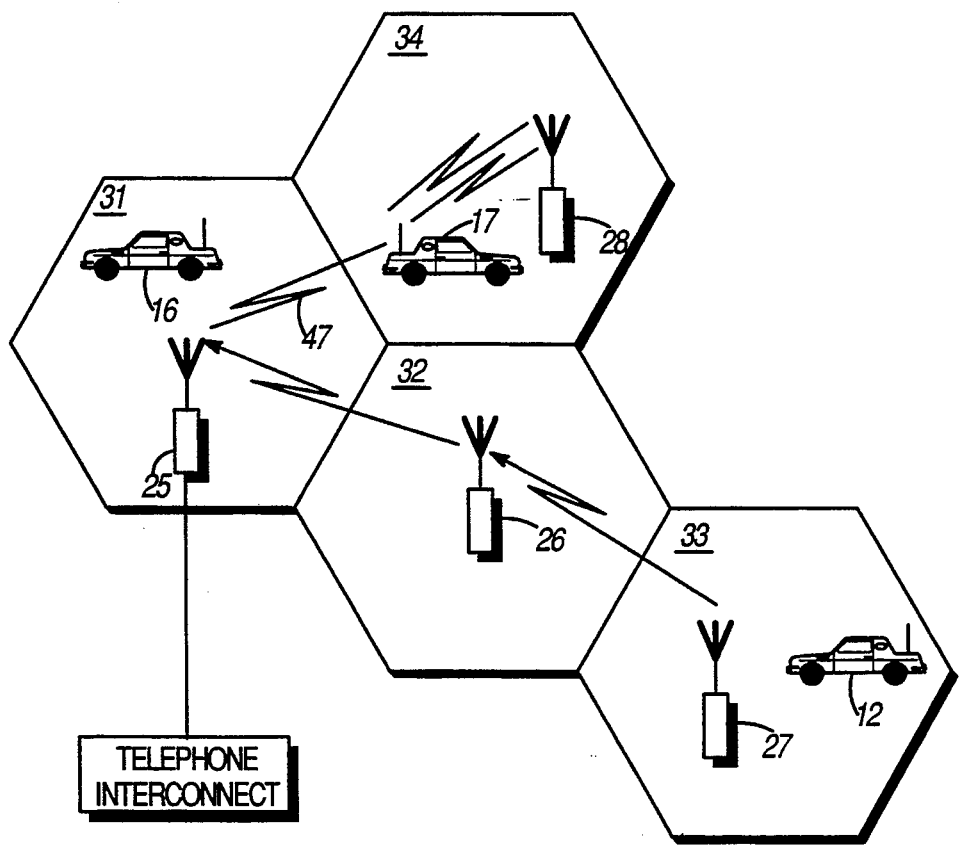
FIG. 5 depicts four dispatch systems, under the invention, showing a requestor in a first dispatch system in contact with a receiver in a second dispatch system and a second receiver in a third dispatch system.

Each system (10) typically has a service coverage area within which communication services are provided to communication units through a base site. The service coverage areas of systems (10) may be co-extensive, partially co-extensive, or completely non-overlapping. For purposes of simplicity and for ease of understanding of the invention it will be assumed that the service coverage areas are non-overlapping and that "dead spots" do not exist between systems. Pursuant to such an assumption FIG. 5 will be used to depict four adjacent dispatch communication systems (10), according to the invention.

Each of the four dispatch communication systems (10) (FIG. 5) typically has a service coverage area (31, 32, 33, or 34) within which communication services are provided to communication units through a base site (25, 26, 27, or 28). Each base site (25, 26, 27, or 28), according to the invention, has a site resource controller (19), a control resource transceiver (20), transceivers (21 and 22), a mobile function transceiver (23), and a mobile function control resource transceiver (24). (For purposes of the following examples it will be assumed that communication units (12, 13, 16 and 17) are part of a trunked dispatch system (10) located within service coverage area 31, served by base site 25.)

In general, to establish a dispatch call between a group of communication units operating in such a system (10) located within service coverage area 31, served by base site 25, a requesting communication unit (12) sends a data packet called an ISW (41) (inbound signalling word) on the inbound frequency allocated to the control resource transceiver (20) at base site 25. The ISW (41) typically contains the requesting communication unit's unique ID code (consisting of a fleet ID and an individual ID, plus a subfleet code indicating that group of units which the requesting communication unit wishes to talk to). The site resource controller (19) decodes the request, and transmits through the control resource transceiver (20) an appropriate frequency grant OSW (outbound signalling word) to the requesting communication unit (12). The requesting unit's (12) frequency grant OSW (42) causes it to move to the designated transmit frequency. At the same time the control resource transceiver transmits an OSW (42) to any target units (13) located within the cell, which OSW identifies a receive frequency. A transceiver (21) is also assigned by the site resource controller (19) in support of the communication transaction. When the requesting unit (12) initiates a voice transmission (43) the base site transceiver (21) receives the transmission (43) and re-transmits the signal on the target mobile's receive frequency (44).

Within a trunked dispatch system (10) communication units (12, 13, 16, and 17) are typically located within the service coverage area (31) of the system (10) to which the communication unit belongs (the "home system"). In such a case the resource controller (19) may reach all target communication units (12, 13, 16, and 17) that are monitoring the outbound control frequency (42). The OSW (44) to the target units causes the target units (12, 13, 16, and 17) to move to the designated receive frequency and time slot for reception.

Figure 2:
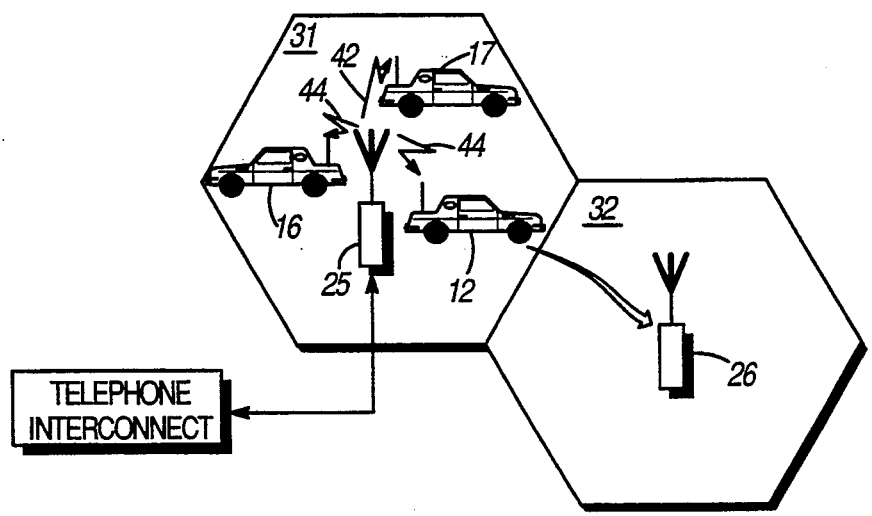
FIG. 2 depicts two dispatch systems, under the invention, showing a requestor at the edge of the coverage area of a first dispatch system in contact with two receivers in the same dispatch system.
Figure 3:
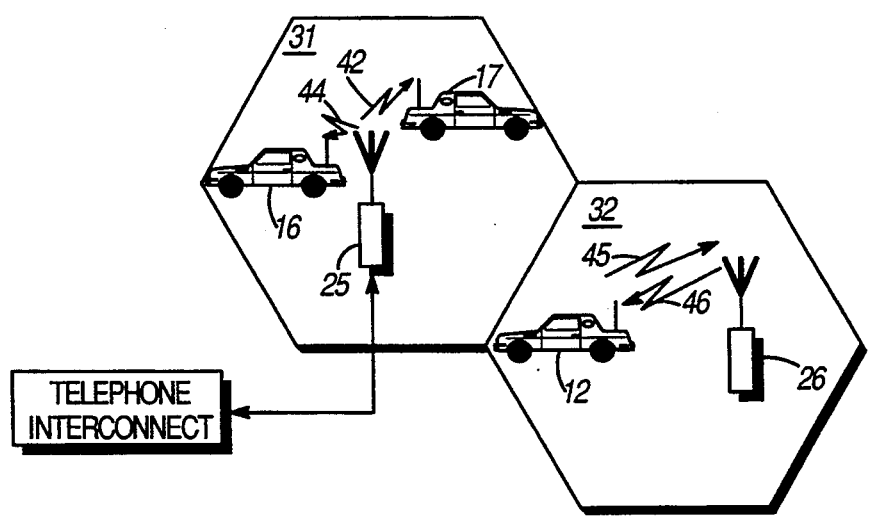
FIG. 3 depicts two dispatch systems, under the invention, showing a requestor after crossing into a second dispatch system in contact with two receivers in a first dispatch system.

When a communication unit (12) crosses a periphery of the service coverage area of the home system (the first system) (31) (FIG. 2) into a second system (32) of a second dispatch system during a transmission, then call relaying must occur or communication will be lost. Under this embodiment communication units (12, 16, and 17 in FIG. 2) during a transmission constantly monitor the signal of the base station repeated transmission (44) where the communication units are located. When a communication unit (12) leaves a service coverage area (31, FIG. 3) then the signal of the transmission (44) falls below a minimum level (exceeds a threshold) and the communication unit (12) scans the available frequencies looking for the control frequency of an adjacent cell (32) and finds the control channel of another resource controller (19) of a local base site (26). The communication unit then sends an ISW (45) to the base site (26). The ISW (45) to the base site (26) contains the unit's ID, a call-relay request, the frequency of transmission from the previous site (25), the control frequency of the previous site (25), and the ID of the previous site (25).

The site resource controller (19) at the local base site (26) monitors for requests for communication resources from communication units and upon receiving such request, allocates transmit and receive communication resources between the first base site (25) and second base site (26).

The base site (26) upon receiving and decoding the ISW (45) transmits an OSW (46) to the communication unit (12) allocating a local frequency to be used in communications between the communication unit (12) and a local transceiver (21) assigned by the resource controller (19) at the local base site (26). The resource controller (19) at the local base site (26) also allocates a mobile function transceiver (23 in FIG. 1) for purposes of exchanging signals between the first dispatch system through base station (25) and the second dispatch system at local base station (26). The communication unit (12) tunes to the appropriate local frequency, the resource controller (19) provides a signal path from the local mobile function transceiver (23) to the local transceiver (21) allocated to the communication unit (12) and communications are restored through the home transceiver (21) at base site 25.

Figure 4:
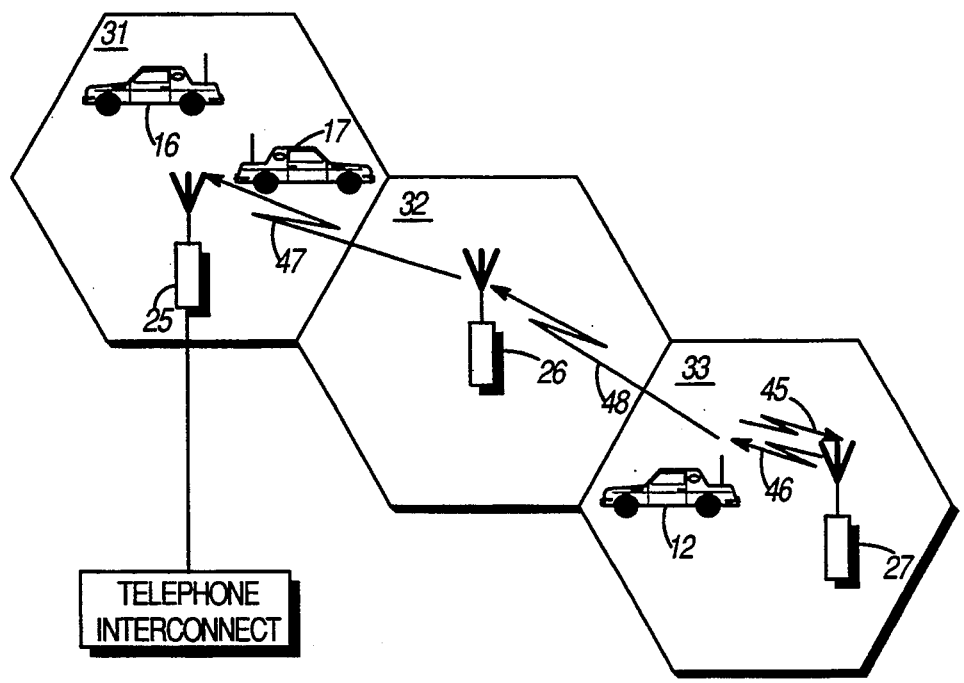
FIG. 4 depicts three dispatch systems, under the invention, showing a requestor in a third dispatch system in contact with two receivers in another dispatch system.

When a communication unit (12) moves into a third dispatch communication system (33) (FIG. 4) the procedure can be expanded further. As the communication unit (12) leaves the second system (32) the communication unit is continuing a transmission (47 and 48) under a frequency grant by the resource controller (26). The base site (26), on the other hand, is acting as a repeater in the transmission of the signals (47 and 48) from the communication unit (12) to the first system (31). As the communication unit (12) leaves the second system (32) the communication unit continues to monitor the transmission (48) from the base site (26). Again, when the signal level of the transmission (48) falls below a minimum level the communication unit scans the available frequencies to identify the control frequency of a closest system. The communication unit now locates the control frequency of the nearest base site (27) and again sends an ISW (45) requesting a call-relaying. The transmission is then relayed by the base site (27) and the process continues. The process could, conceivably, be carried on with any number of cells.

If, on the other hand, after the communication unit (12) had entered the third cell (33) another communication unit (17) leaves its service area (FIG. 5) then a similar procedure is used. As communication unit (17) leaves the service coverage area of the original base site (25) the transmission (47) again falls below a minimum level. Communication unit (17) scans the available frequencies and finds the control frequency of a base site (28). The communication unit (17) sends an ISW (45) requesting call-relaying. The transmission is again relayed by base site 28 and the process continues.

In another embodiment of the invention a communication unit (12) outside the home system (31) (FIG. 3) may desire to transmit a communicated signal to target communication units (13, 16, and 17). The communication unit (12) scans a set of resources and identifies a control resource of the local dispatch system (26). The communication unit (12) transmits a resource request to the local system (26) including an ID of the communication unit (12) and IDs of intended target communication units (13, 16, and 17).

The local system (26) upon receipt of the request identifies the request as a request for access to an adjacent system (25) by reference to the ID of the communication unit (12). The local system, in response transmits an access request to the home system (25) through the local mobile function control resource transceiver (24) located at the local base site (26).

The home system (25) upon receipt of the request transmits an access grant to the local system (26). Upon receipt of the access request from the home system (25) the local system (26) transmits an access grant to the communication unit (12). The local system also allocates a transceiver (21) and mobile function transceiver (23) and signal path therebetween. Upon tuning to proper frequencies the requesting communication unit (12) transmits a signal to the local system (26), which system upon receipt of such signal re-transmits such signal to the home system (25).

We claim:

1. An apparatus for relaying signals between a first and second dispatch communication system with each communication system of the first and second communication system having a plurality of communication units that transmit and receive signals using a predetermined format and a service coverage area with a periphery, wherein at least the first communication system includes the apparatus for relaying signals comprising:
    A) a plurality of communication resources configured to communicate with at least some of the plurality of communication units of the first and second communication systems;
    B) at least one communication control resource;
    C) at least one communication resource configured to transmit and receive signals in the format; and
wherein at least one of the plurality of communication units is transmitting and receiving a communicated signal through the second communication system, said at least one communication unit including scanning means for detecting the at least one control resource of the first communication system and control means for requesting, when near the periphery of the service coverage area of the second communication system and over the at least one control resource, that the first communication system allocate communication resources to relay the communicated signal to and from the second communication system.

2. The communication system as recited in claim 1, wherein the at least one communication unit transmitting and receiving a communicated signal monitors the communicated signal signal strength of said second communication system and when the signal strength exceeds a threshold requests additional communication resources from said first communication system.

3. A method of assigning communication resources to communication units in a first communication system and a second communication system, the communication systems having:
    A) a plurality of communication resources;
    B) a service coverage area for each communication system;
    C) a communication unit near the periphery of the service coverage area of the second communication system and entering the service coverage area of the first communication system, transmitting and receiving a signal through the second communication system;
and wherein the communication unit includes scanning means for detecting control frequencies of the first communication system, and wherein the communication unit includes control means for requesting over a control resource that the first communication system allocate communication resources to relay the signal to and from the second communication system, the method comprising the steps of:

A) monitoring by the communication systems the receive control resource for requests for communication resources from the communication unit;

B) receiving at the first communication system a request for communication resources from the communication unit, such request containing the ID of the communication unit, the ID of the second base site, and the frequency used by the communication unit in transmitting and receiving the signal with the second communication system;

C) allocating by the first communication system a communication resource between the communication unit and the first communication system;

D) allocating by the first communication system a transmit and receive resource between the first communication system and the second communication system; and, E) allocating by the first communication system a signal path between the communication unit and the second communication system.

4. The method of assigning communication resources in claim 3, wherein the communication unit monitors the communicated signal strength of said second communication system transmit resource and when the signal strength exceeds a threshold requests additional communication resources from said first communication system.

* * * * *